(12) United States Patent
Ulrich et al.

(10) Patent No.: US 6,806,950 B2
(45) Date of Patent: Oct. 19, 2004

(54) APPARATUS FOR DETERMINING A LIGHT POWER LEVEL, MICROSCOPE, AND METHOD FOR MICROSCOPY

(75) Inventors: Heinrich Ulrich, Heidelberg (DE); Holger Birk, Meckesheim (DE); William C. Hay, Heppenheim (DE); Holger Nissle, Heidelberg (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/154,938

(22) Filed: May 24, 2002

(65) Prior Publication Data

US 2002/0191177 A1 Dec. 19, 2002

(30) Foreign Application Priority Data

May 25, 2001 (DE) .......................................... 101 25 469

(51) Int. Cl.$^7$ ................................................. G01J 1/42
(52) U.S. Cl. ...................................................... 356/218
(58) Field of Search .............................. 356/213, 218, 356/2, 27, 229–232; 359/4–7, 15, 24, 566–568, 576, 562

(56) References Cited

U.S. PATENT DOCUMENTS

| | | | | |
|---|---|---|---|---|
| 4,375,680 A | * | 3/1983 | Cahill et al. | 367/149 |
| 5,475,491 A | * | 12/1995 | Shiozawa | 356/394 |
| 5,568,317 A | | 10/1996 | Bohn et al. | 359/618 |
| 6,028,708 A | | 2/2000 | Gramann et al. | 359/629 |
| 6,304,372 B1 | * | 10/2001 | Spink | 359/369 |
| 6,309,601 B1 | * | 10/2001 | Juncosa et al. | 422/68.1 |
| 6,496,261 B1 | * | 12/2002 | Wilsher et al. | 356/450 |
| 6,507,419 B1 | * | 1/2003 | Popovich et al. | 359/15 |
| 2003/0043469 A1 | * | 3/2003 | Weckstrom | 359/618 |

FOREIGN PATENT DOCUMENTS

| | | |
|---|---|---|
| CH | 651 939 | 10/1985 |
| DE | 33 41 589 | 6/1984 |
| DE | 197 02 753 | 7/1998 |
| EP | 0 283 002 | 9/1988 |
| EP | 0 137 272 | 6/1991 |
| GB | 2 107 483 | 10/1982 |
| JP | 55137508 | 10/1980 |
| JP | 60 187941 | 9/1985 |
| JP | 61 289544 | 12/1986 |
| JP | 62 001141 | 1/1987 |
| JP | 04 301236 | 10/1992 |

OTHER PUBLICATIONS

J. Brakenhoff, Imaging modes in confocal scanning light microscopy (CSLM), Journal of Microscopy, vol. 117, Pt. 2, Nov. 1979, pp. 233–242.

"Imaging modes in confocal scanning light microscopy (CSLM)", G. J. Brakenhoff, Journal of Microscopy, vol. 117, Pt. 2, 233–242, Nov., 1979, revised Apr. 9, 1979.

* cited by examiner

*Primary Examiner*—Michael P. Stafira
(74) *Attorney, Agent, or Firm*—Simpson & Simpson, PLLC

(57) ABSTRACT

An apparatus for determining the light power level of a light beam (7), having a beam splitter (1) and a detector (11) associated with the beam splitter (1), is disclosed. The apparatus is characterized in that the beam splitter (1) splits measuring light (23) out of the light beam and conveys it to the detector (11), and that the ratio between the light power level of the light beam (7) and the light power level of the measuring light (23) measured at the detector (11) is constant over time.

35 Claims, 6 Drawing Sheets

APPARATUS FOR DETERMINING A LIGHT POWER LEVEL, MICROSCOPE, AND METHOD FOR MICROSCOPY

CROSS REFERENCE TO RELATED APPLICATIONS

This application claims priority of the German patent application 101 25 469.5-51, which is incorporated by reference herein.

FIELD OF THE INVENTION

The invention concerns an apparatus for determining the light power level of a light beam.

The invention furthermore concerns a microscope.

Additionally the invention concerns a confocal scanning microscope.

The invention concerns as wellmethod for microscopy.

BACKGROUND OF THE INVENTION

In order to measure the power level of a light beam, it is common practice to split a measuring beam out of the light beam using a beam splitter and first to determine the power level of the measured beam by means of a detector that generates an electrical signal proportional to the power level of the measured beam, in order then, with a knowledge of the splitting ratio of the beam splitter, to draw conclusions as to the power level of the light beam. The German Patent Application 197 02 753 A1 discloses an arrangement for monitoring the laser radiation coupled into a scanning head by means of a detection element onto which a portion of the coupled-in radiation is directed via a beam splitter.

Arrangements of the aforesaid kind achieve only limited accuracy and reproducibility. They are susceptible to external disturbances, in particular to vibrations and thermal influences.

In scanning microscopy, a specimen is illuminated with a light beam in order to observe the detected light, constituting reflected or fluorescent light, emitted by the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to determine the present mirror position.

In confocal scanning microscopy specifically, a specimen is scanned in three dimensions with the focus of a light beam. A confocal scanning microscope generally comprises a light source, a focusing optical system with which the light of the source is focused onto an aperture stop (called the "excitation stop"), a beam splitter, a beam deflection device for beam control, a microscope optical system, a detection stop, and the detectors for detecting the detected or fluorescent light. The illuminating light is coupled in via a beam splitter. The fluorescent or reflected light coming from the specimen arrives by way of the beam deflection device back at the beam splitter, passes through the latter, and is then focused onto the detection stop behind which the detectors are located. This detection arrangement is called a "descan" arrangement. Detected light that does not derive directly from the focus region takes a different light path and does not pass through the detection stop, so that a point datum is obtained which results, by sequential scanning of the specimen, in a three-dimensional image. A three-dimensional image is usually achieved by acquiring image data in layers. Commercial scanning microscopes usually comprise a scanning module that is flange-mounted onto the stand of a conventional light microscope, the scanning microscope additionally containing all the aforesaid elements necessary for scanning a specimen.

A known method for compensating for or correcting fluctuations of the illuminating light power level is based on using a beam splitter to split a measured beam off from the illuminating light beam, and utilizing the ratio between the measured power levels of the measured beam and detected light beam for image generation or image calculation. This procedure is disclosed, for example, in the publication of G. J. Brakenhoff, Journal of Microscopy, Vol. 117, pt. 2, November 1979, pp. 233–242.

The aforementioned German Patent Application 197 02 753 A1 also discloses that in scanning microscopy, the formation of signal quotients or signal subtraction of a detected signal brings about noise reduction and can reduce intensity fluctuations. Because of the limited accuracy and reproducibility of the power level measurement already alluded to, however, the known microscopes can achieve only approximate compensation for fluctuations in the illuminating light.

SUMMARY OF THE INVENTION

It is therefore the object of the invention to propose an apparatus that allows the power level of a light beam to be determined in a largely accurate and reproducible manner.

The aforesaid object is achieved by an apparatus for determining the light power level of a light beam, the apparatus comprises: a beam splitter and a detector associated with the beam splitter, wherein the beam splitter splits measuring light out of the light beam and conveys it to the detector; and the ratio between the light power level of the light beam and the light power level of the measuring light measured at the detector is constant over time.

It is a further object of the invention to describe a microscope that makes possible reliable and improved elimination of and/or compensation for fluctuations in the illuminating light power level.

This object is achieved by a microscope which comprises: a light source which emits an illuminating light beam to illuminate a specimen, at least one detector for detecting a detection light proceeding from the specimen a device for determining the light power level of the illuminating light beam, having a beam splitter and a detector associated with the beam splitter, and the detector is arranged directly behind the beam splitter.

It is a further object of the invention to describe a confocal scanning microscope that makes possible reliable and improved elimination of and/or compensation for fluctuations in the illuminating light power level.

This object is achieved by a confocal scanning microscope comprises: a light source which emits an illuminating light beam to illuminate a specimen, at least one detector for detecting a detection light proceeding from the specimen a device for determining the light power level of the illuminating light beam, having a beam splitter and a detector associated with the beam splitter, and the detector is arranged directly behind the beam splitter.

An additional object of the invention is to describe a method for microscopy that makes possible efficient, reliable, and largely accurate compensation for fluctuations in the illuminating light power level.

This object is achieved by a method which is characterized by the following steps:

determining a light power level of an illuminating light beam with an apparatus that comprises a beam splitter and a detector associated with the beam splitter, in which context the beam splitter splits measured light out of the illuminating light beam and conveys it to the detector, and the ratio between the light power level of the illuminating light beam and the light power level of the measured light measured at the detector is constant over time;

determining a light power level of a detected light beam proceeding from a specimen; and determining a corrected light power level by correlating the light power level of the illuminating light beam and the light power level of the detected light beam.

The invention has the advantage of making possible a reliable measurement of the light power level of a light beam. The invention furthermore has the advantage of reliable, interference-insensitive, and largely accurate compensation for light power level fluctuations, in particular fluctuations in the illuminating light for illuminating a specimen in microscopy and in scanning microscopy.

What has been recognized according to the present invention is that the known inaccuracies and unsatisfactory reproducibility of known apparatuses for measuring the light power level of a light beam are attributable, among other factors, to interferences within the measured light which result, in the event of even the slightest mechanical or thermal disturbance, in large fluctuations in the measured light power level. Accurate compensation for fluctuations in the illuminating light power level, or stabilization of the illuminating light power level in a microscope, is limited by these disadvantages.

In a preferred embodiment, the detector receives the measured light with reduced spatial and/or temporal coherence. For that purpose, a diffusing optical element such as a roughened glass plate or a milk-glass disk is provided in the beam path of the measured light. In a particularly preferred embodiment, the beam splitter comprises a substrate that has a diffusely scattering surface or that is at least partially made of milk glass.

A variant embodiment in which the detector is arranged directly behind the beam splitter is particularly advantageous. This variant is particularly insensitive to external influences, interference-resistant, and compact. Multiple reflections in the beam splitter often create several interference-capable partial beams, particularly at the coated and uncoated interfaces. The detector is therefore advantageously arranged in such a way that it is illuminated only by the primary split-off measured light, but not by other partial light beams. In a further advantageous embodiment, the entrance window of the detector itself, which preferably is coated in semi-reflective fashion, serves as the beam splitter.

In a preferred embodiment, the beam splitter is made of a substrate that comprises a semi-reflective coating. Preferably this is a metallic or dielectric coating. In another preferred embodiment, the coating is applied directly on the detector or on the entrance window of the detector housing. In a preferred variant embodiment, the beam splitter or coating is configured in such a way that the ratio between the light power level of the light beam and the light power level of the measured light measured at the detector is largely independent of the wavelength of the light beam.

In a further embodiment, the beam splitter (1) and the detector (11) are combined into one unit which comprises a housing.

Very particularly preferred is an embodiment having a beam splitter that generates one transmitted and one reflected partial beam, and exclusively the transmitted partial beam, constituting the measuring beam, strikes the detector. The reflected partial beam is directed, as the illuminating light beam, onto a specimen.

In a further embodiment, the microscope is a scanning microscope or a confocal scanning microscope that preferably comprises a processing unit that correlates the measured power level of the measuring light, in consideration of the splitting ratio of the beam splitter and other system parameters, with the power level of the detected light or of a portion thereof, for example the power level of a portion of the detected light from a specific spectral region. By determining a corrected light power level, fluctuations in the power level of the illuminating light are corrected. Very particularly advantageous is an embodiment in which offsets (caused, for example, by the dark current of detectors) can be determined prior to scanning and thus can be taken into account in the correlation. In a preferred embodiment, a processing unit comprising a programmable digital electronic system, for example a field programmable gate array (FPGA), is provided.

A semiconductor detector, such as a photodiode or an avalanche or PIN diode, a CCD chip, or a photodetector is preferably provided for determining the power level of the measuring light, since semiconductor detectors have a particularly small physical configuration. Photomultipliers or photomultiplier arrays can also be used.

Correlation of power level P of the detected light beam with power level M of the measuring light, taking into consideration offset $P_0$ of the detector for measuring the power level of the detected light and offset $M_0$ of the detector for measuring the power level of the measuring light, is preferably accomplished using the following formula:

$$M_{korr} = \frac{P - P_0}{M - M_0}(\overline{M} - M_0),$$

where $\overline{M}$ is preferably the detected light power level averaged over an image or an image line, or over selectable scan points.

Taking the offsets, in particular, into consideration is particularly advantageous in this context, since if only the ratio of the detected light power level to the power level of the measurement is calculated, even offset components that are constant over time do not cancel one another out. Offsets can derive from the detectors, for example due to incorrect zeroing, or they can be caused by scattered or ambient light unintentionally reaching the detectors. In a particular embodiment of a scanning microscope, the offsets are determined automatically before an image is scanned. For that purpose, the illuminating light is interrupted and the signals proceeding from the detectors are measured and stored. Using a scaling step (which in the simplest case can comprise multiplication by a constant), the corrected light power level can be adapted to any desired scale.

The method according to the present invention comprises, in the first two steps, determining a light power level of an illuminating light beam with an apparatus that comprises a beam splitter and a detector associated with the beam splitter, in which context the beam splitter splits measuring light out of the illuminating light beam and conveys it to the detector, and the ratio between the light power level of the illuminating light beam and the light power level of the measuring light measuring at the detector is constant over time; and determining the light power level of a detected light beam proceeding from a specimen. Preferably both light power levels are obtained using detectors that generate electrical signals proportional to the respective light power level. In one embodiment, the signals are digitized and are correlated with one another in an FPGA unit or a PC; as a result, a corrected detected light power level is determined which can be used for image generation or image calculation. In another embodiment, correlation of the signals is performed in analog fashion.

In another variant embodiment, the light power levels of the illuminating light beam and the detected light beam are determined simultaneously.

BRIEF DESCRIPTION OF THE DRAWINGS

The subject matter of the invention is depicted schematically in the drawings and will be described below with reference to the Figures, identically functioning elements being given the same reference characters. In the drawings.

DETAILED DESCRIPTION OF THE INVENTION

Figure 1:
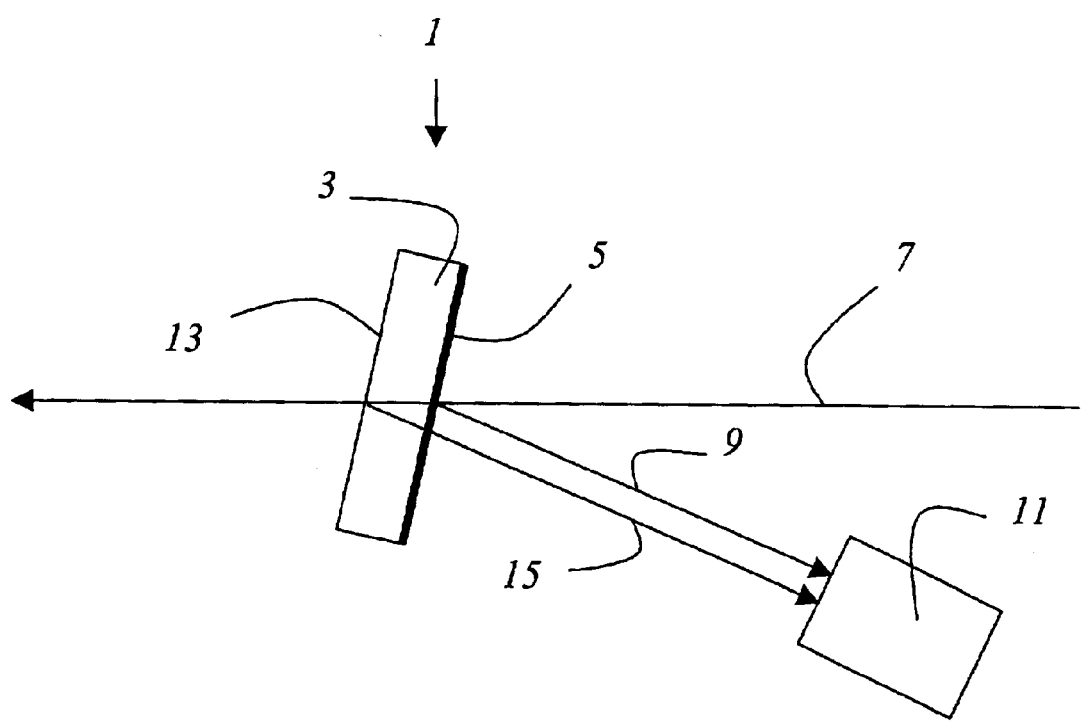
FIG. 1 shows a known apparatus for light power level measurement.

FIG. 1 shows an apparatus for light power level measurement according to the existing art. The apparatus encompasses a beam splitter 1 that comprises a substrate 3 having a semi-reflective coating 5. Incident light beam 7 strikes beam splitter 1. At coating 5, the measuring light 9 is split off by reflection and strikes detector 11 arranged at a distance of approx. 3 cm. The splitting ratio is approx. 50:1. The portion of light beam 7 passing through the coating experiences a further (undesirable) splitting at uncoated interface 13 of substrate 3. Further measuring light 15, whose power level is approx. 4% of the power level of the portion of light beam 7 that has passed through the coating, is reflected at interface 13 to detector 11. Measuring light 9 split off at the coating interferes, at the detector, with measuring light 15 split off at uncoated interface 13 of substrate 3. Even very small variations in the optical path length between beam splitter 1 and detector 11 or in substrate 3, for example due to temperature changes, air pressure fluctuations, or vibrations, result in a change in the interference, which is expressed as a large variation in the measured light power level.

Figure 2:
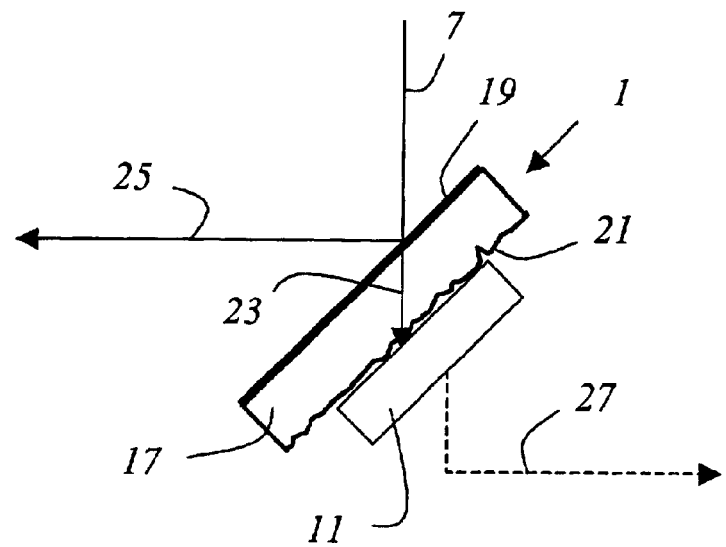
FIG. 2 shows an apparatus according to the present invention for determining the light power level of a light beam.

FIG. 2 shows an apparatus according to the present invention for determining the light power level of a light beam 7. The apparatus comprises a beam splitter 1 having a substrate 17 that has one smooth surface having a semi-transparent metallic coating 19, and one roughened, diffusely scattering surface 21. A detector 11 which is embodied as a photodiode is cemented directly onto roughened surface 21 of substrate 17. Light beam 7 striking beam splitter 1 is split into transmitted measuring light 23 and a reflected partial beam 25 at a 1:40 ratio. As a result of roughened surface 21, the interference capability of the light striking detector 11 is largely abolished. Because of its small physical size, the apparatus is extremely insensitive to external disturbances. The detector generates an electrical signal that is proportional to the power level of the incoming measuring light 23 and can be conveyed via line 27 to a processing unit.

Figure 3:
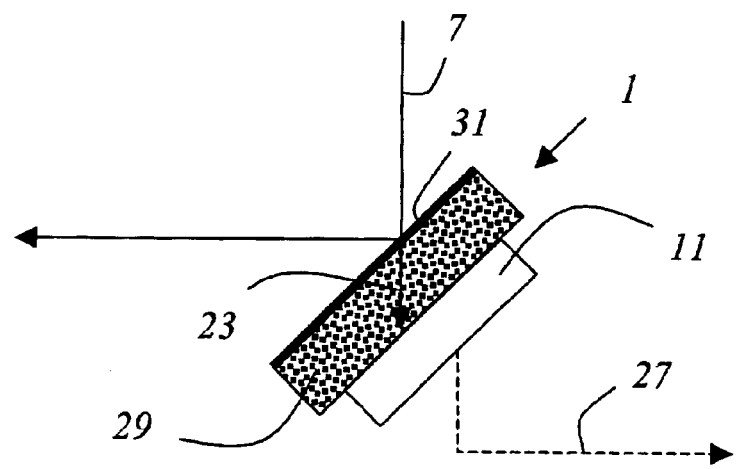
FIG. 3 shows a further apparatus according to the present invention for determining the light power level of a light beam.

FIG. 3 shows a further apparatus according to the present invention for determining the light power level of a light beam. The apparatus contains a beam splitter 1 that comprises a substrate made of milk glass 29 and a semi-reflective dielectric coating 31. Light beam 7 incident onto the coating is 97% reflected. Measuring light 23 passing through the coating is scattered in the substrate made of milk glass 29, and reaches detector 11 with most of its interference capability abolished. The detector generates an electrical signal that is proportional to the power level of the incoming measuring light 23 and can be conveyed via line 27 to a processing unit.

Figure 4:
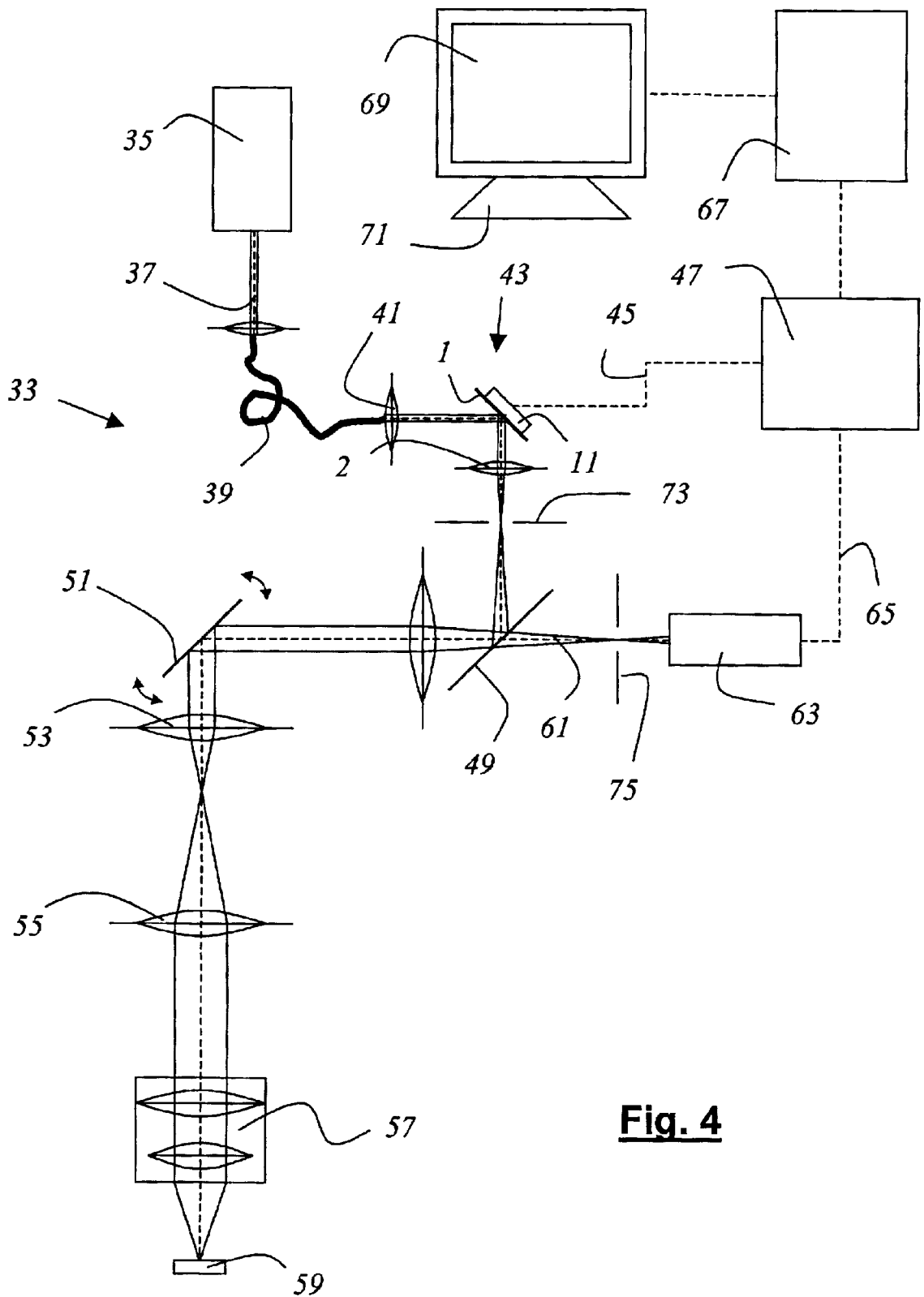
FIG. 4 shows a microscope according to the present invention.

FIG. 4 schematically shows a microscope 33 according to the present invention that is embodied as a confocal scanning microscope. Illuminating light beam 37 coming from an illumination system 35 is transported through a glass fiber 39 and, after being coupled out of glass fiber 39 by means of optical system 41, encounters an apparatus 43 for determining the power level of the illuminating light beam, which by way of a beam splitter 1 splits a measured beam out of the illuminating light beam and conveys it to detector 11. Beam splitter 1 contains a substrate made of milk glass. Detector 11 generates an electrical signal that is proportional to the power level of the measuring light and is conveyed via line 45 to processing unit 47. Illuminating light beam 37 arrives via a beam splitter 49 at the gimbal-mounted scanning mirror 51, which guides the beam through scanning optical system 53, tube optical system 55, and objective 57, and over or through specimen 59. In the case of non-transparent specimens 59, illuminating light beam 37 is guided over the specimen surface. In the case of biological specimens 59 (preparations) or transparent specimens, illuminating light beam 37 can also be guided through specimen 59. This means that different focal planes of the specimen are scanned successively by illuminating light beam 37. Subsequent assembly then yields a three-dimensional image of the specimen. Detected light 61 proceeding from the specimen passes through objective 57, tube optical system 55, and scanning optical system 53 and arrives via scanning mirror 51 at beam splitter 49, passes through the latter, and strikes a detector apparatus 63 that is embodied as a photomultiplier. Electrical detection signals proportional to the power level of the detected light are generated in detector apparatus 63 and forwarded via line 65 to processing unit 47. In processing unit 47, the incoming analog signals are first digitized and then digitally correlated with one another, and a corrected detected light power level is determined. This is forwarded to a PC 67. The corrected detected light power level is associated, on the basis of a position signal of the gimbal-mounted mirror, with the position of the pertinent scan point, and the data of all the scan points are assembled into an image of specimen 69 that is displayed on a display 71. Illumination pinhole 73 and detection pinhole 75 that are usually provided in a confocal scanning microscope are drawn in schematically for the sake of completeness. Certain optical elements for guiding and shaping the light beams, however, are omitted in the interest of better clarity. These are sufficiently familiar to those skilled in this art.

Figure 5:
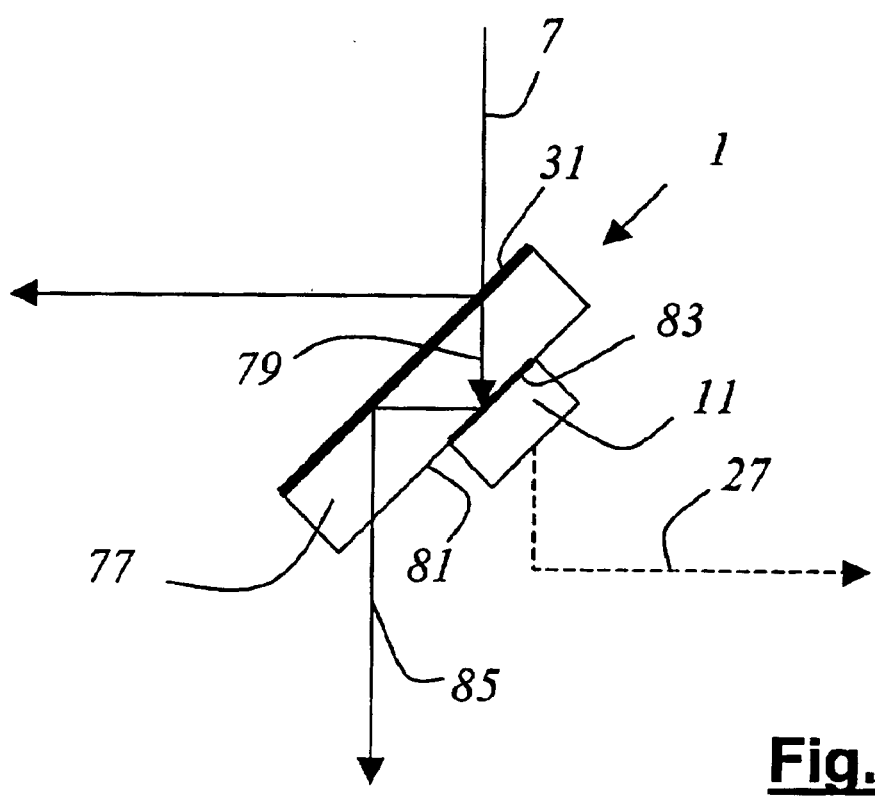
FIG. 5 shows a further apparatus according to the present invention for determining the light power level of a light beam.

FIG. 5 shows a further apparatus according to the present invention for determining the light power level of a light beam 7. Measuring light 79 passes through the semi-reflective dielectric coating 31 that is applied onto a glass substrate 77. A detector 11 is cemented onto the substrate on interface 81 located opposite the coated interface of glass substrate 77. The optical properties of cement 83 are matched to the refractive index of the glass substrate and the refractive index of the entrance window of detector 11 in such a way that reflections are largely prevented. In order also to prevent aberrations due to reflected light 85 that nevertheless occurs, the detector is arranged in such a way that the optical path of the reflected light bypasses detector 11.

Figure 6:
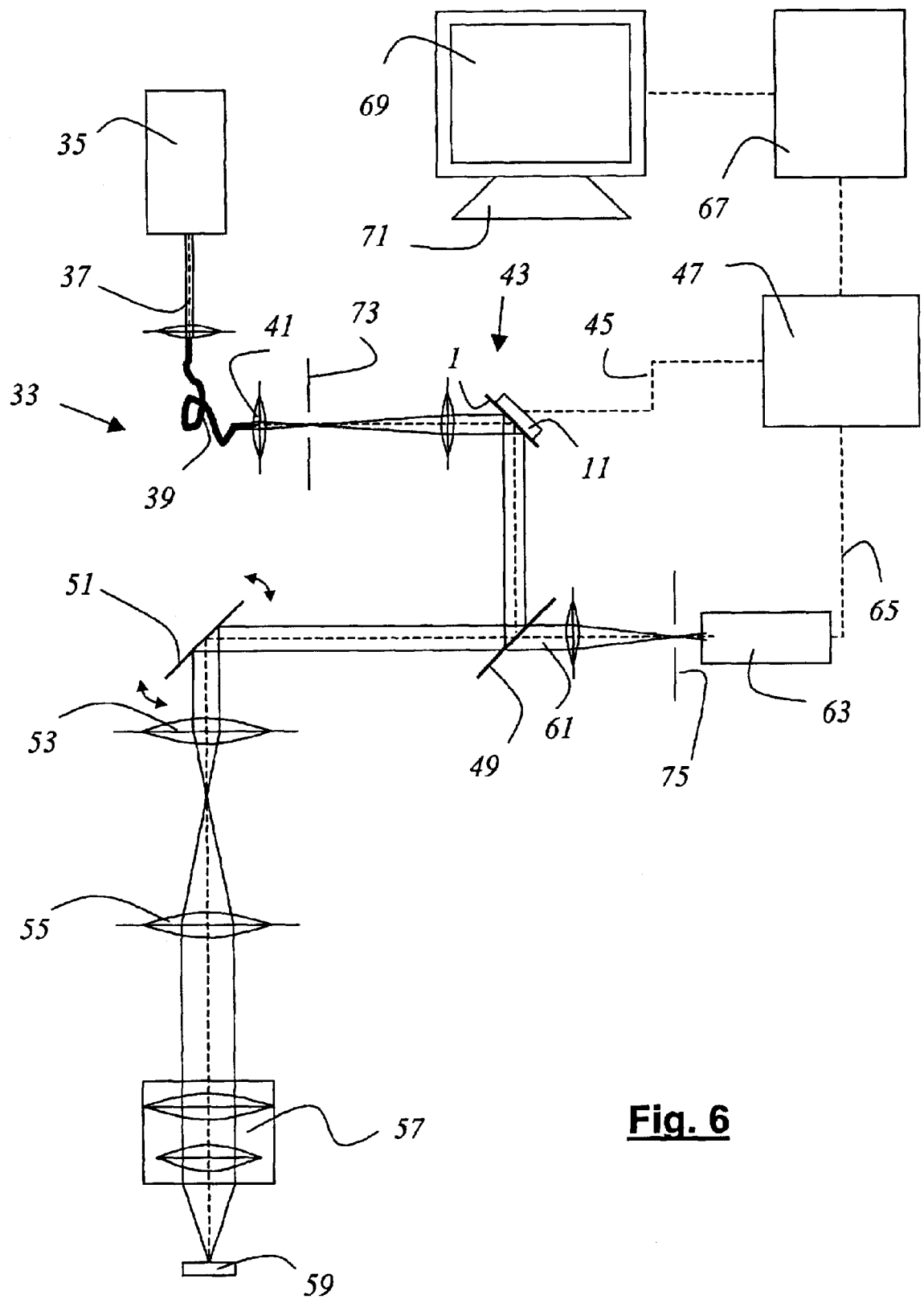
FIG. 6 shows a further microscope according to the present invention.

FIG. 6 schematically shows a further microscope 33 according to the present invention that is embodied as a confocal scanning microscope. Microscope 33 that is depicted corresponds largely to the microscope shown in FIG. 4. In this embodiment, apparatus 43 for determining the power level of the illuminating light beam is arranged between illumination pinhole 73 and beam splitter 49.

Figure 7:
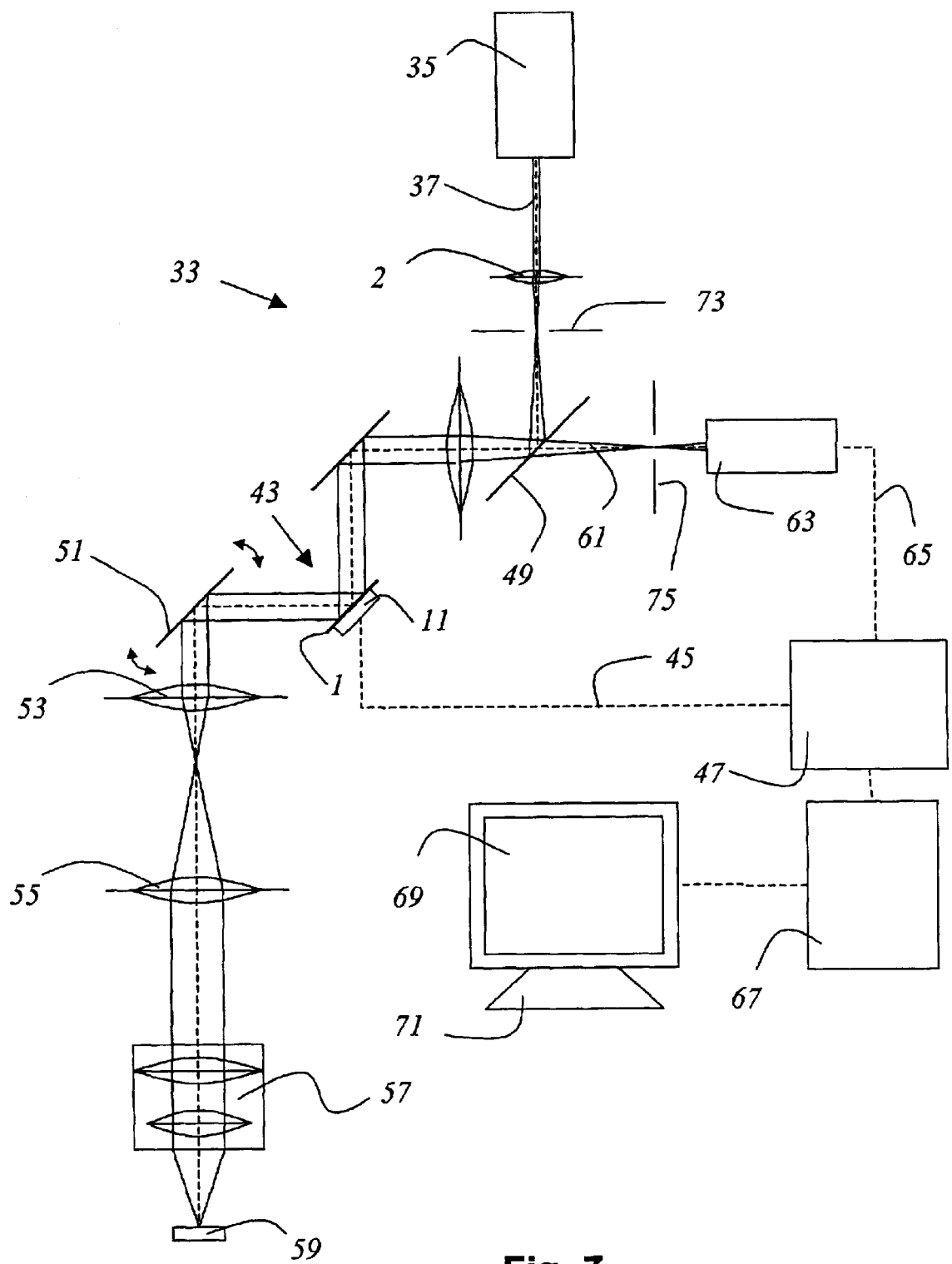
FIG. 7 shows a further microscope according to the present invention.

FIG. 7 schematically shows a further microscope 33 according to the present invention that is embodied as a confocal scanning microscope. Microscope 33 that is depicted corresponds largely to the microscope shown in FIG. 4. In this embodiment, apparatus 43 for determining the power level of the illuminating light beam is arranged between the gimbal-mounted scanning mirror 51 and scanning optical system 53. Microscope 33 has the additional advantage that fluctuations in the power level of a polarized illuminating light beam 37 that are attributable to fluctuations in polarization direction, due to differences in the reflectivity of beam splitter 49 for different polarization directions, are also sensed.

The present invention has been described with reference to a particular embodiment. It is self-evident, however, that changes and modifications can be made without thereby leaving the range of protection of the following claims.

What is claimed is:

1. An apparatus for determining a light power level of an incident light beam, the apparatus comprising:
   a beam splitter and a non-feedback detector associated with the beam splitter, wherein the beam splitter splits a measuring light beam out of the incident light beam and conveys the measuring light beam to the detector;
   wherein the detector quantifies a light power level of the measuring light; and,
   wherein a ratio between the light power level of the light beam and the light power level of the measuring light is constant over time.

2. The apparatus as defined in claim 1, wherein the detector is arranged directly behind the beam splitter.

3. The apparatus as defined in claim 1, wherein the beam splitter has a substrate and a coating and a substrate on which the coating is placed.

4. The apparatus as defined in claim 3, wherein the substrate has at least one diffusing surface arranged opposite to the coating.

5. The apparatus as defined in claim 3, wherein the substrate is made at least partially of milk glass.

6. The apparatus as defined in claim 1, wherein the ratio between the light power level of the light beam and the light power level of the measuring light measured at the detector is largely independent of the wavelength of the light beam.

7. The apparatus as defined in claim 1, wherein the beam splitter and the detector are combined into one unit.

8. An apparatus for determining a light power level of an incident light beam, the apparatus comprising:
   a beam splitter and a non-feedback detector associated with the beam splitter, wherein the beam splitter splits a measuring light beam out of the incident light beam and conveys the measuring light beam to the detector;
   wherein the detector quantifies a light power level of the measuring light;
   wherein a ratio between the light power level of the light beam and the light power level of the measuring light is constant over time; and,
   wherein the beam splitter and the detector are combined into one unit.

9. The apparatus as defined in claim 8, wherein the unit comprises a housing.

10. The apparatus as defined in claim 8, wherein the detector is arranged directly behind the bean splitter, and wherein the beam splitter has a substrate and a coating on which the coating is placed.

11. The apparatus as defined in claim 10, wherein the coating is a metallic coating.

12. The apparatus as defined in claim 10, wherein the substrate has at least one diffusing surface arranged opposite to the coating.

13. The apparatus as defined in claim 10, wherein the substrate is made at least partially of milk glass.

14. The apparatus as defined in claim 8, wherein the beam splitter generates transmitted measuring light and a reflected partial beam, and exclusively the transmitted measuring light strikes the detector.

15. A microscope comprising:
   a light source, wherein said light source emits an illuminating light beam to illuminate a specimen;
   a detector for detecting a detection light proceeding from the specimen; and,
   a device for determining the light power level of the illuminating light beam;
   wherein said device comprises:
      a beam splitter; and,
      a non-feedback detector associated with the beam splitter;
      wherein the detector is arranged directly behind the beam splitter.

16. The microscope as defined in claim 15 wherein the beam splitter splits measuring light out of the illuminating light beam and conveys it to the detector; and the ratio between the light power level of the illuminating light beam and the light power level of the measuring light measured at the detector is constant over time.

17. The microscope as defined in claim 15, wherein the beam splitter and the detector are combined into one unit.

18. The microscope as defined in claim 15, wherein the beam splitter has a coating and a substrate wherein the coating is formed on the substrate.

19. The microscope as defined in claim 18, wherein the coating is a metallic coating.

20. The microscope as defined in claim 15, wherein the substrate has at least one diffusing surface arranged opposite to the coating.

21. The microscope as defined in claim 15, wherein the substrate is made at least partially of milk glass.

22. The microscope as defined in one of claim 15, wherein the beam splitter generates transmitted measuring light and a reflected partial beam, and exclusively the transmitted measuring light strikes the detector.

23. The microscope as defined in claim 15, wherein the ratio between the light power level of the illuminating light beam and the light power level of the measuring light measured at the detector is largely independent of the wavelength of the illuminating light beam.

24. A confocal scanning microscope comprising:
- a light source; wherein said light source emits an illuminating light beam to illuminate a specimen;
- a detector for detecting a detection light proceeding from the specimen; and,
- a device for determining the light power level of the illuminating light beam;
- wherein said device comprises:
  - a beam splitter; and,
  - a non-feedback detector associated with the beam splitter;
  - wherein the detector is arranged directly behind the beam splitter.

25. A method for microscopy, characterized by the following steps:
- determining a light power level of an illuminating light beam with a device that comprises a beam splitter and a non-feedback detector associated with the beam splitter, in which context the beam splitter splits measuring light out of the illuminating light beam and conveys it to the detector, and the ratio between the light power level of the illuminating light beam and the light power level of the measuring light measured at the detector is constant over time;
- determining a light power level of a detected light beam proceeding from a specimen with a device comprising a detector; and
- determining a corrected light power level of the detected light beam by correlating the light power level of the illuminating light beam and the light power level of the detected light beam.

26. The method as defined in claim 25, wherein determination of the light power levels of the illuminating light beam and of the detected light beam is accomplished simultaneously.

27. The method as defined in claim 25, wherein determination of the light power level of the illuminating light beam encompasses an offset compensation.

28. The method as defined in claim 25, wherein determination of the light power level of the detected light beam encompasses an offset compensation.

29. The method as defined in claim 25, wherein the determination encompasses a scaling step.

30. The microscope as defined in claim 15, wherein said detection light detector comprises one sensing element.

31. The microscope as defined in claim 15, wherein said detection light detector comprises a plurality of sensing elements.

32. The confocal scanning microscope as defined in claim 24, wherein said detection light detector comprises one sensing element.

33. The confocal scanning microscope as defined in claim 24, wherein said detection light detector comprises a plurality of sensing elements.

34. The method as defined in claim 25, wherein said detected light detector and said illuminating light detector each comprise one sensing element.

35. The method as defined in claim 25, wherein said detected light detector and said illuminating light detector each comprise a plurality of sensing elements.

* * * * *